United States Patent [19]

Ernst et al.

[11] Patent Number: 5,069,340
[45] Date of Patent: Dec. 3, 1991

[54] STRIP OF COLLATED FASTENERS FOR FASTENER-DRIVING TOOL

[75] Inventors: Richard J. Ernst, Rolling Meadows; Don T. Van Allman, Palatine; Harish C. Gupta, Downers Grove; Michael C. Dill, Elk Grove Village; Martin J. Nilsen, Hampshire, all of Ill.

[73] Assignee: Illinois Tool Works Inc., Glenview, Ill.

[21] Appl. No.: 664,754

[22] Filed: Mar. 5, 1991

[51] Int. Cl.$^5$ .................. B65D 85/24; B25C 1/00
[52] U.S. Cl. .................. 206/347; 206/820; 227/120
[58] Field of Search .............. 206/338–348, 206/820; 227/120, 136, 137, 541, 908; 411/442, 443

[56] References Cited

U.S. PATENT DOCUMENTS

| | | | |
|---|---|---|---|
| 3,927,459 | 12/1975 | Haytayan | 206/347 |
| 3,944,067 | 3/1976 | Bakoledis | 206/347 |
| 3,954,176 | 5/1976 | Haytayan | 206/347 |
| 4,047,611 | 9/1977 | Damratowski | 206/820 |
| 4,106,618 | 8/1978 | Haytayan | 206/820 |
| 4,298,121 | 11/1981 | Oide et al. | 206/343 |
| 4,718,551 | 1/1988 | Whitledge | 206/347 |
| 4,881,643 | 11/1989 | Pfister | 206/345 |
| 4,932,821 | 6/1990 | Steffen et al. | 206/347 |
| 5,005,699 | 4/1991 | Kawashima et al. | 206/344 |

Primary Examiner—Jimmy G. Foster
Attorney, Agent, or Firm—Neal C. Johnson; Thomas W. Buckman; John P. O'Brien

[57] ABSTRACT

In a strip of collated fasteners, each having a shank and a head, a carrier molded from a polymeric material has a sleeve for each fastener. Each sleeve has an annular portion and a breakable portion, which breaks into two segments as the fastener gripped by such sleeve is driven. The breakable portion, which is notched at one end, has a pair of similar, laterally opposed, outwardly opening, continuously curved concave recesses with open windows, from which portions of the fastener shank emerges. In a fastener-guiding tool, parallel ribs of a guiding device fit into such recesses, into close proximity with the emerging portions, so as to guide the strip between such ribs.

14 Claims, 6 Drawing Sheets

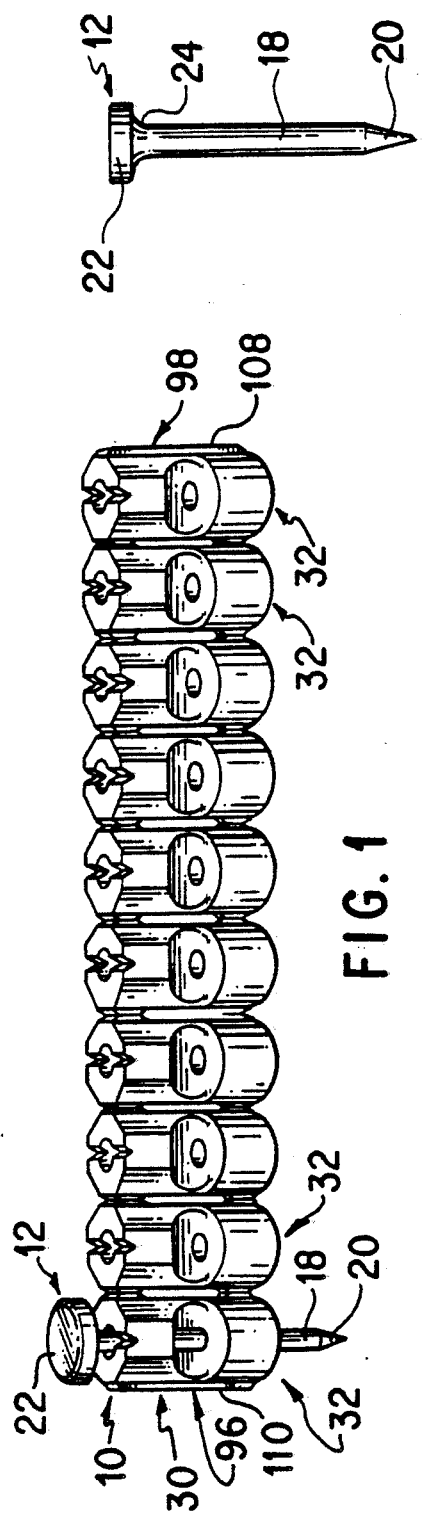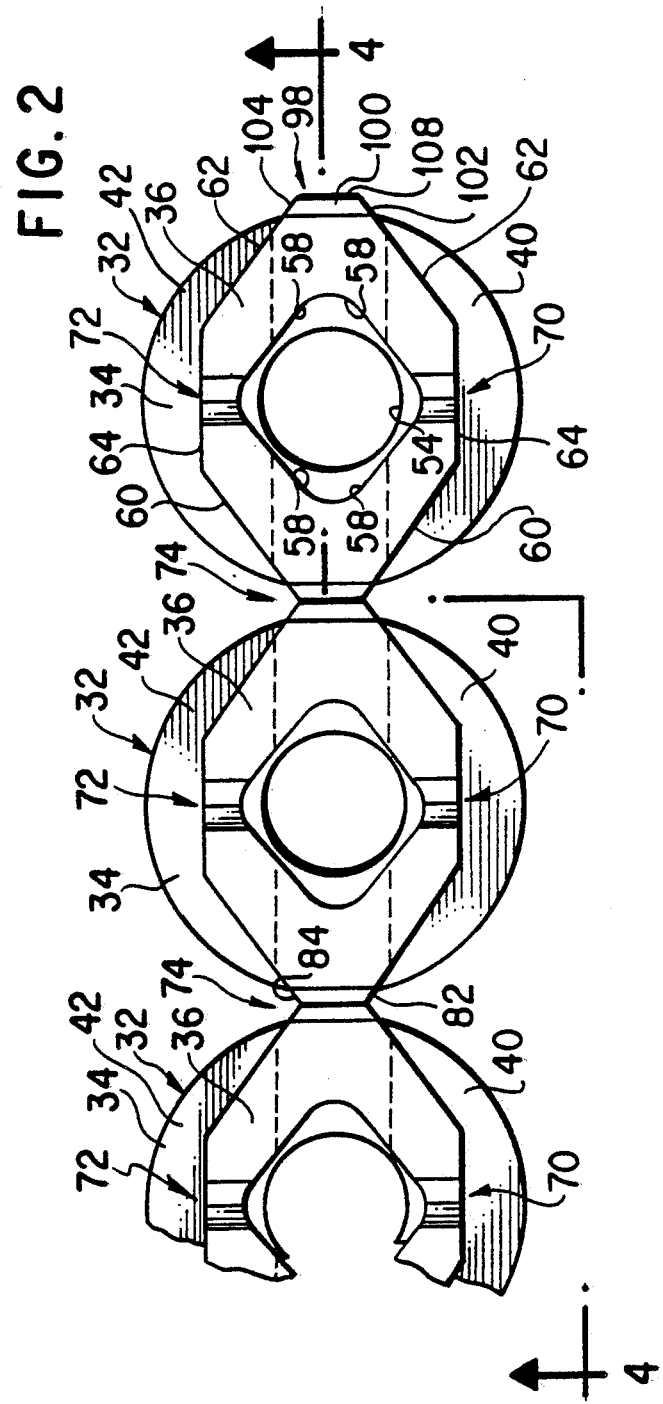

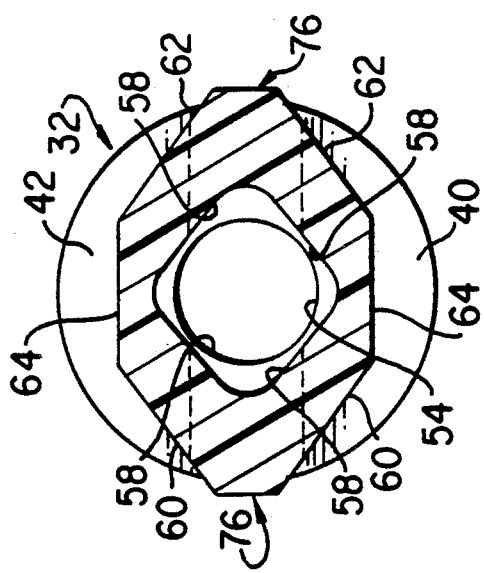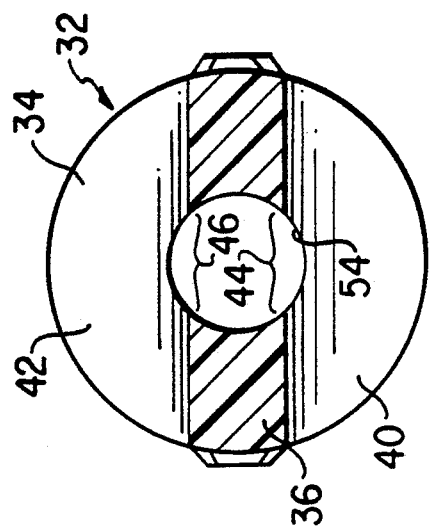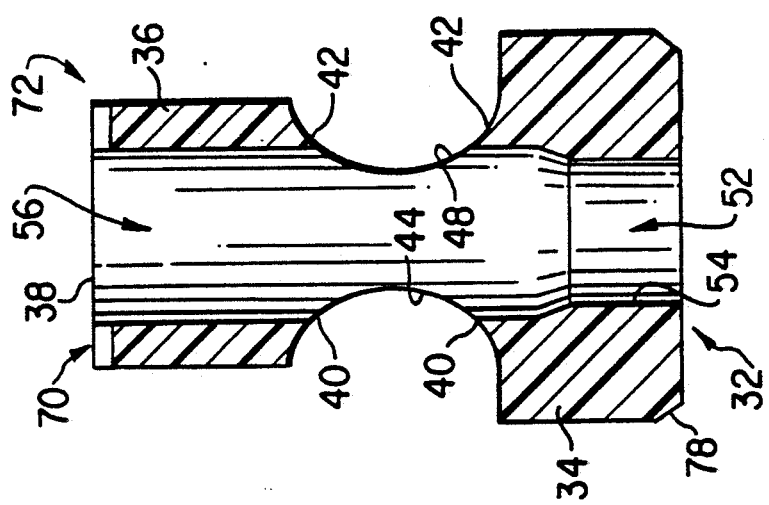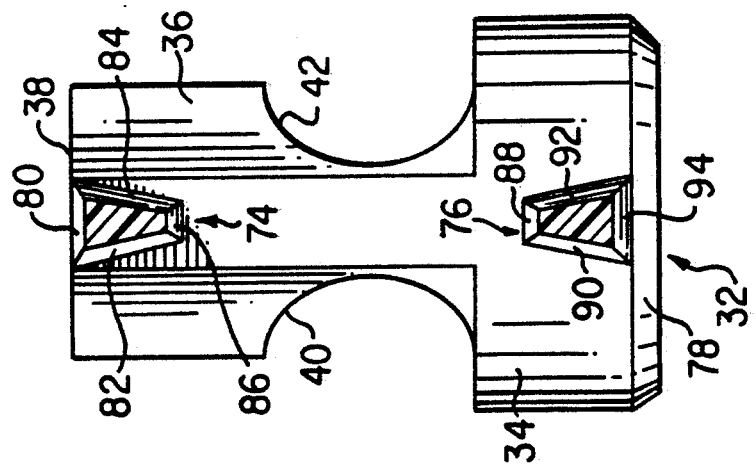

5,069,340

STRIP OF COLLATED FASTENERS FOR FASTENER-DRIVING TOOL

TECHNICAL FIELD OF THE INVENTION

This invention pertains to a strip of collated fasteners, such as nails or drive pins, for a fastener-driving tool, which may be pneumatically powered or combustion-powered. The strip employs an improved carrier molded from a polymeric material so as to comprise a sleeve associated with each fastener.

BACKGROUND OF THE INVENTION

Fastener-driving tools, which may be pneumatically powered or combustion-powered, are used widely for driving fasteners of a type having an elongate shank with a pointed end and a head. Typically, such fasteners are designed to be forcibly driven through a workpiece, into a substrate. Such fasteners include nails designed to be forcibly driven into wood and drive pins designed to be forcibly driven into concrete or masonry. Typically, in such a drive pin, the shank has a portion flaring outwardly where the shank adjoins the head. An exemplary use of such drive pins is for attaching metal channels, which are used to mount plasterboard walls, or other metal workpieces to concrete substrates.

Many fastener-driving tools require such fasteners to be fed in strips, in which the fasteners are collated, through magazines having mechanisms for feeding the strips of collated fasteners. Commonly, such fasteners are collated via carriers molded from polymeric materials, such as polypropylene, with individual sleeves, bushings, or holders for the respective fasteners and with frangible bridges between successive sleeves, bushings or holders. Examples of such fasteners collated via such carriers are disclosed in Haytayan U.S. Pat. Nos. 3,927,459, 3,954,176, and 4,106,618, in Whitledge U.S. Pat. No. 4,718,551, and in Steffen et al. U.S. Pat. No. 4,932,821.

This invention is addressed to providing improvements in a strip of collated fasteners of the type noted above wherein the strip comprises a carrier molded from a polymeric material.

SUMMARY OF THE INVENTION

This invention provides, in a strip of collated fasteners of the type noted above, an improved carrier molded from a polymeric material, such as polypropylene, which is preferred. The carrier comprises a sleeve associated with each fastener. A representative sleeve includes a lower, annular portion and an upper portion, which is integral with the annular portion. Such sleeve grips the associated fastener with the lower, annular portion nearer to the pointed tip of the fastener head, and with the upper portion nearer to the fastener head. Moreover, the upper portion has an outwardly opening, curved, concave recess, preferably a pair of laterally opposed, outwardly opening, similarly curved, concave recesses. The carrier comprises frangible bridges between adjacent ones of the sleeves of the carrier.

Herein, such terms as "upper", "lower", and "vertical" are used merely to refer to a convenient orientation of the strip but not to limit the strip to any particular orientation.

According to a first aspect of this invention, the upper portion constitutes a breakable portion, which has an upper end, and which has a pair of concave recesses, as noted above. The concave recesses shape the breakable portion so that the breakable portion breaks into at least two segments, approximately along a vertical plane bisecting each of the concave recesses. The breakable portion breaks into such segments when the outwardly flaring portion of the shank of the associated fastener bears against the upper end as the associated fastener is driven forcibly through a workpiece, into a substrate, after the annular portion has been arrested by the workpiece. The annular portion eliminates any gap between the head of the associated fastener and the workpiece after the associated fastener has been driven. The respective pieces, into which the breakable portion breaks, tend to remain integral with the annular portion after the associated fastener has been driven.

It is preferred that the breakable portion, at the upper end, is notched in at least two positions or locations, generally along a line where the vertical plane bisecting each of the concave recesses meets the upper end.

Preferably, the annular portion has a circular aperture having a cylindrical wall gripping the shank of the associated fastener, and the breakable portion has a generally polygonal aperture having plural interior faces confining the same shank. Preferably, moreover, the breakable portion has a generally polygonal shape having plural exterior faces, each interior face being oriented so as to be substantially parallel to a respective one of the exterior faces.

In a preferred arrangement, the generally polygonal aperture is a generally quadrilateral aperture having four interior faces confining the shank of the associated fastener. Moreover, in the preferred arrangement, the breakable portion has a generally hexagonal shape having six exterior faces. Two of the six exterior faces are parallel to each other but not to any of the four gripping faces.

According to a second aspect of this invention, each concave section of the upper portion has an open window, from which a portion of the shank of the associated fastener emerges. If the upper portion has a pair of concave recesses, as noted above, the emerging portions are opposed diametrically to each other.

Moreover, the strip of collated nails may be advantageously combined with a device for guiding the strip of collated fasteners longitudinally, in a fastener-driving tool. The guiding device comprises a pair of parallel ribs. Each rib fits into a respective one of the concave recesses of at least one sleeve of the carrier, into close proximity with the exposed portions of the shank gripped thereby, so as to guide the strip of collated fasteners between the parallel ribs. The parallel ribs are spaced from each other so as to permit the strip of collated fasteners to move along and between the parallel ribs.

Preferably, in the fastener-driving tool noted in the preceding paragraph, the strip of collated nails and the guiding device are combined also with a nosepiece, which has a bore configured to permit a representative fastener of the strip and the sleeve gripping the representative fastener to enter the bore to be forcibly driven through the bore, and with a mechanism for driving a firstmost fastener of the strip and the sleeve gripping the firstmost fastener forcibly through the bore. Preferably, moreover, the guiding device is arranged to guide the strip of collated fasteners so as to guide the firstmost fastener and the sleeve gripping the firstmost fastener into a position where such fastener and such strip can enter the bore and can be forcibly driven through the bore. Preferably, moreover, the frangible bridges between a representative sleeve and other portions of the carrier shear so as to separate such sleeve and retained portions of such bridges from other portions of the carrier, such that such sleeve and retained portions fit snugly into the bore so as to center the fastener gripped by such sleeve within the bore.

One important advantage of this invention is that the annular portion not only eliminates any gap between the head of the associated fastener and the workpiece but also absorbs shocks imparted by a fastener-driving tool to such fastener when such fastener is driven by such tool. Therefore, the useful life of elastomeric bumpers and other wearable parts of such a tool can be significantly lengthened, as contrasted with the useful life that may be ordinarily expected if such tool is used routinely to drive such fasteners through metal workpieces, into concrete substrates.

A significant advantage of combining the improved carrier provided by this invention with a guiding device in a fastener-driving tool, as noted above, is that frictional contact occurs between steel surfaces of the emerging portions of the fastener shanks and steel surfaces of the guiding device, rather than between polymeric surfaces of the carrier and steel surfaces of the guiding device.

These and other objects, features, and advantages of this invention are evident from the following description of a preferred embodiment of this invention, with reference to the accompanying drawings.

BRIEF DESCRIPTION OF THE DRAWINGS

FIG. 1 is a perspective view of a strip of collated fasteners (one shown) of the type noted above wherein the strip comprises a carrier molded of a polymeric material.

FIG. 2 is an elevational view of a representative fastener of the strip.

FIG. 3, on an enlarged scale, is a fragmentary, upper plan view of three successive sleeves of the carrier, as viewed from the upper end of such sleeves.

FIG. 6 is a sectional view, as taken along line 6—6 of FIG. 4, in a direction indicated by arrows.

FIG. 7 is a sectional view, as taken along line 7—7 of FIG. 4, in a direction indicated by arrows.

FIG. 8 is a sectional view, as taken along line 8—8 of FIG. 4, in a direction indicated by arrows.

FIG. 9 is a sectional view, as taken along line 9—9 of FIG. 4, in a direction indicated by arrows.

FIG. 14 also shows a metal channel and a concrete substrate, to which the metal channel is affixed by the same fastener.

DETAILED DESCRIPTION OF PREFERRED EMBODIMENT

Figure 4:
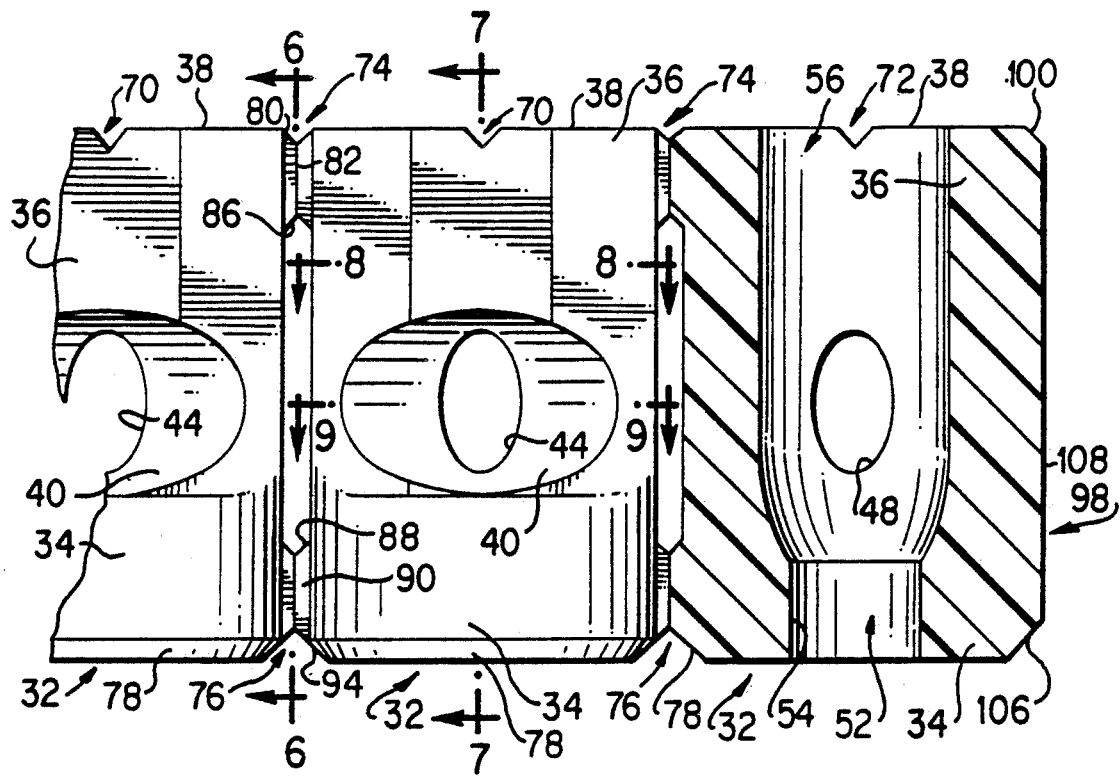
FIG. 4 is a partly elevational, partly sectional view, as taken along line 4—4 of FIG. 3, in a direction indicated by arrows.
Figure 5:
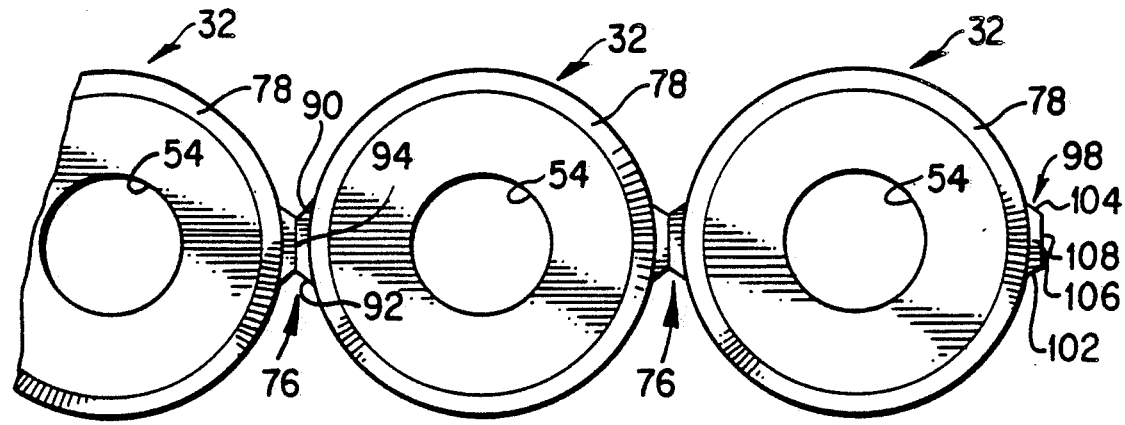
FIG. 5, on a similar scale, is a fragmentary, plan view of the same sleeves, as viewed from the lower end of such sleeves.

As shown in FIG. 1, a strip 10 of collated fasteners 12 (one shown in FIG. 1) constitutes a preferred embodiment of this invention. Each fastener 12 is a drive pin, which is made from hardened steel. Each fastener 12 is designed to be forcibly driven through a workpiece, such as a galvanized steel, U-shaped channel 14 shown in FIGS. 14 and 15, into a substrate, such as a concrete substrate 16 shown in FIGS. 14 and 15. As shown in FIG. 2, each fastener 12 has an elongate shank 18, which has a pointed end 20, and a head 22. The shank 18 is cylindrical except for the pointed end 20, which is frusto-conical, and except for a portion 24 flaring outwardly where the shank 18 adjoins the head 22.

Along with the fasteners 12, the strip 10 comprises a carrier 30, which is molded from a polymeric material. Polypropylene is a preferred material for the carrier 30. The carrier 30 has a separate sleeve 32 for each fastener 12. Each sleeve 32 includes a lower, annular portion 34 and an upper, breakable portion 36, which is integral with the annular portion 34. Each sleeve 32 grips the shank 18 of the associated fastener 12, in a manner to be later described, with the annular portion 34 nearer to the pointed end 20 of the same shank 18 and with the breakable portion 36 nearer to the head 22 of the same fastener 12. The breakable portion 36 has an upper end 38 opposite to the annular portion 34.

In each sleeve 32, the breakable portion 36 has a pair of similar, laterally opposed, outwardly opening, concave recesses 40, 42. The concave section 40 has an open window 44, which is defined in a manner to be later described, and from which a portion 46 of the shank 18 of the associated fasteners 12 emerges. The concave section 42 has an open window 48, which is defined similarly, and from which a portion 50 of the same shank 18 emerges. The emerging portions 46, 50, of such shank 18 are opposed diametrically to each other.

The annular portion 34 of each sleeve 32 has a circular aperture 52 having a cylindrical wall 54, which grips the shank 18 of the associated fastener 12 Moreover, the breakable portion 36 of each sleeve 32 has a generally quadrilateral aperture 56 having rounded corners, as shown in FIG. 3, and having four interior faces 58, which confine the shank 18 of the associated fastener 12. As shown in FIG. 3, such aperture 56 is elongated, along the strip 10, so as to conform substantially to a rhombus when viewed along the axis of the shank 18 of the associated fasteners 12. Furthermore, the breakable portion 36 of each sleeve 32 has a generally hexagonal shape having six exterior faces, namely two exterior faces 60 oriented at an acute angle relative to each other at a leading end of such sleeve 32, two exterior faces 62 oriented at a similar angle relative to each other at a trailing end of each sleeve 32, and two exterior faces 64 parallel to each other at opposite sides of such sleeve 32. Each of the interior faces 58 of each sleeve 32 is oriented so as to be substantially parallel to a respective one of the exterior faces 60 of such sleeve 32 or to a respective one of the exterior faces 62 of such sleeve 32. However, although parallel to each other, the exterior faces 64 are not parallel to any of the interior faces 58.

Herein, the terms "leading" and "trailing" are used merely to refer respectively to the right and left ends of the strip 10, as viewed in FIGS. 1, 3, 4, and 5. It should be here noted that the strip 10 is symmetrical about a plane bisecting the strip 10 between its ends and about a plane including the axes of the shanks 18 of the fasteners 12 of the strip 10.

In each sleeve 32, the open window 44 of the concave section 40 is defined where the generally quadrilateral aperture 56 described above intersects the curved surface of the concave section 40, at one of the rounded corners of such aperture 56 at a given side of such sleeve 32. Similarly, the open window 48 of the concave section 42 is defined where the same aperture 56 intersects the curved surface of the concave section 42, at one of the rounded corners of such aperture 56 at the other side of such sleeve 32.

The upper end 38 of the breakable portion 36 of each sleeve 32 is notched on opposite sides of the quadrilateral aperture 56 of such portion 36. Thus, such end 38 is formed with two V-shaped notches 70, 72, which extend generally along a line where a vertical plane bisecting each of the concave recesses 40, 42, thereof meets such end 38.

The strip 10 comprises frangible bridges connecting adjacent ones of the sleeves 32, namely an upper, frangible bridge 74 and a lower, frangible bridge 76 between each such sleeve 32 and the next sleeve 32. As shown in FIG. 6, each of the frangible bridges 74, 76, is shaped so as to conform generally to an isosceles trapezoid in cross-section. Each bridge 74 extends to the upper end 38 of the breakable portion 36 of each of the sleeves 32 connected by such bridge 74. Each bridge 76 extends to a lower, chamfered portion 78 of the annular portion 34 of each of the sleeves 32 connected by such bridge 76. Each bridge 74 has four V-shaped notches extending along respective lines in a vertical plane bisecting such bridge 74, namely a relatively long, upper notch 80, two similar, lateral notches 82, 84, and a relatively short, lower notch 86. Each bridge 76 has four V-shaped notches extending long respective lines in a vertical plane bisecting such lower bridge 76, namely a relatively short, upper notch 88, two similar, lateral notches 90, 92, and a relatively long, lower notch 94.

The sleeve 32 at the trailing end of the strip 10 has a space-filling rib 96 extending between the upper end 38 of such sleeve 32 and the lower, chamfered portion 78 of such sleeve 32. The sleeve 32 at the leading end of the strip 10 has a similar rib 98 extending between the upper end 38 of such sleeve 32 and the lower, chamfered portion 78 of such sleeve 32. As shown in FIGS. 3 and 4, the rib 98 has a tapered, upper surface 100, two tapered, lateral surfaces 102, 104, a tapered, lower surface 106, and a planar surface 108 at the leading end of the strip 10. Similarly, the rib 96 has tapered upper, lateral, and lower surfaces, and a planar surface 110 at the trailing end of the strip 10. As measured along the strip 10, each of the ribs 96, 98, has a thickness equal approximately to one-half of the thickness of one of the frangible bridges 74, 76.

Accordingly, when a given fastener 12 is being driven forcibly through a workpiece, into a substrate, via a fastener-driving tool, the frangible bridges between the associated sleeve 32 and each adjacent sleeve 32 are sheared. The frangible bridges therebetween tend to be cleanly sheared where the upper, lateral, and lower notches are deepest, so that such sleeve 32 retains approximately one half of the thickness of each of the frangible bridges 72, 74 that had connected such sleeve 32 to any preceding or following sleeve 32. The overall length of such sleeve 2, as measured along the strip 10, is equal approximately to the diameter of the annular portion 34 of such sleeve 32, plus one-half of the thickness of each of the frangible bridges that had connected such sleeve 32 to the preceding sleeve 32, plus one-half of the thickness of the frangible bridges that had connected such sleeve 32 to the following sleeve 32. If such sleeve 32 has one of the ribs 96, 98, the overall length of such sleeve 32, as measured along the strip 10, would be approximately equal thereto, since each of the ribs 96, 98, has a thickness equal to one-half of the thickness of one of the frangible bridges 74, 76. By tending to be cleanly sheared where the upper, lateral, and lower notches are deepest, the frangible bridges 74, 76, lend dimensional uniformity to the respective sleeves 32.

Figures 10, 11, 12, 13:
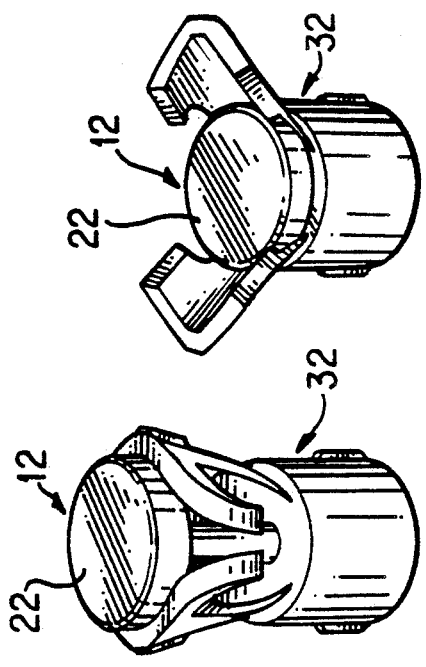
FIGS. 10 through 13 respectively are smaller, fragmentary, perspective views of a representative sleeve and a representative fastener gripped thereby, at successive stages when such fastener is being driven.
Figure 14:
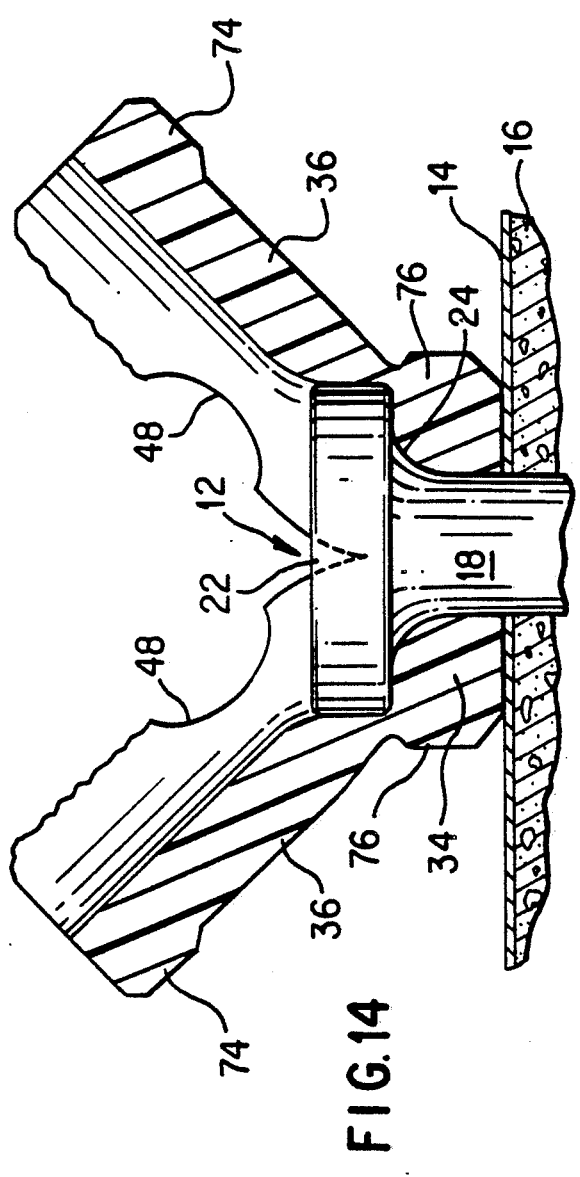
FIG. 14 is a greatly enlarged, fragmentary, elevational view of the same sleeve and the same fastener, as shown in FIG. 13.

Additionally, when a given fastener 12 is being driven forcibly through a workpiece, into a substrate, the annular portion 34 of the sleeve 32 gripping the given fastener 12 is arrested by the workpiece, as suggested in FIG. 14, in which the steel channel 14 and the concrete substrate 16 are shown fragmentarily. Thereupon, the outwardly flaring portion 24 of the shank 18 of the given fastener 12 bears against the upper end 38 of the breakable portion 36 at the quadrilateral aperture 56 while the annular portion 34 is arrested by the workpiece whereupon the breakable portion 36 of the sleeve 32 gripping the given fastener 12 breaks into two segments, as shown. Such portion 36 breaks from the notches 70, 72, at its upper end 38, substantially along the vertical plane bisecting its concave recesses 40, 42, to a depth beyond the open windows 44, 48, of such recesses 40, 42. Such portion 36 breaks in successive stages, as suggested by FIGS. 10 through 13 and by FIG. 14, which corresponds to FIG. 13. The segments, into which the breakable portion 36 breaks, tend to remain integral with the annular portion 34. It is possible, however, for one of or both of the segments occasionally to break away, for the breakable portion 34 occasionally to break into more than two segments, or both.

Thus, the annular portion 34 spaces the head 22 of the associated fastener 12 from the workpiece and eliminates any gap between such head 22 and the workpiece after the associated fastener 12 has been driven through the workpiece, into the substrate. Also, the annular portion 34 absorbs shocks imparted by a fastener-driving tool to such fastener 12 when such fastener 12 is driven by such tool. Therefore, the useful life of elastomeric bumpers and other wearable parts of such a tool can be significantly lengthened, as contrasted with the useful life that may be ordinarily expected if such tool is used routinely to drive such fasteners through metal workpieces, into concrete substrates.

Initially, before any fastener 12 is driven from the strip 10, the fastener 12 at the leading end of the strip 10 is the firstmost fastener 12 subsequently, as successive fasteners 12 are driven from the strip 10, the next fastener 12 of the strip 10 becomes the firstmost fastener 12.

Figure 15:
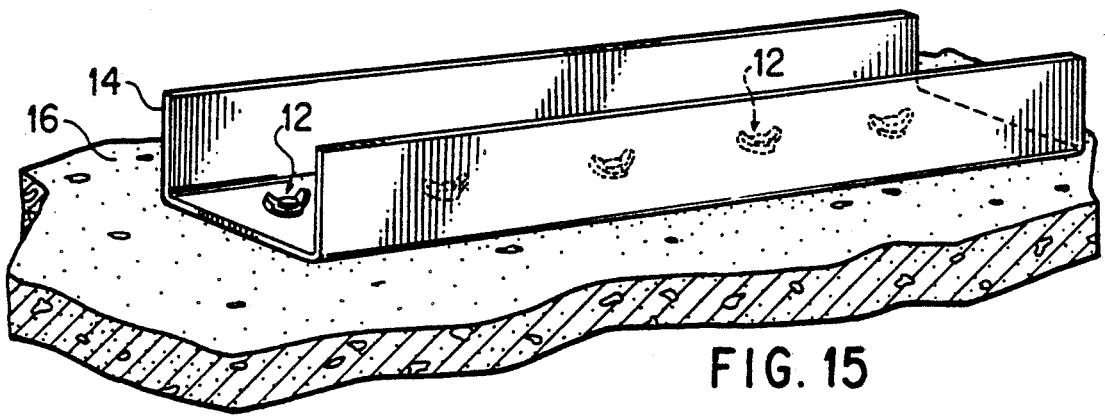
FIG. 15, on a smaller scale, is a fragmentary, perspective view of the metal channel, as affixed to a concrete substrate by five fasteners from the strip.
Figure 16:
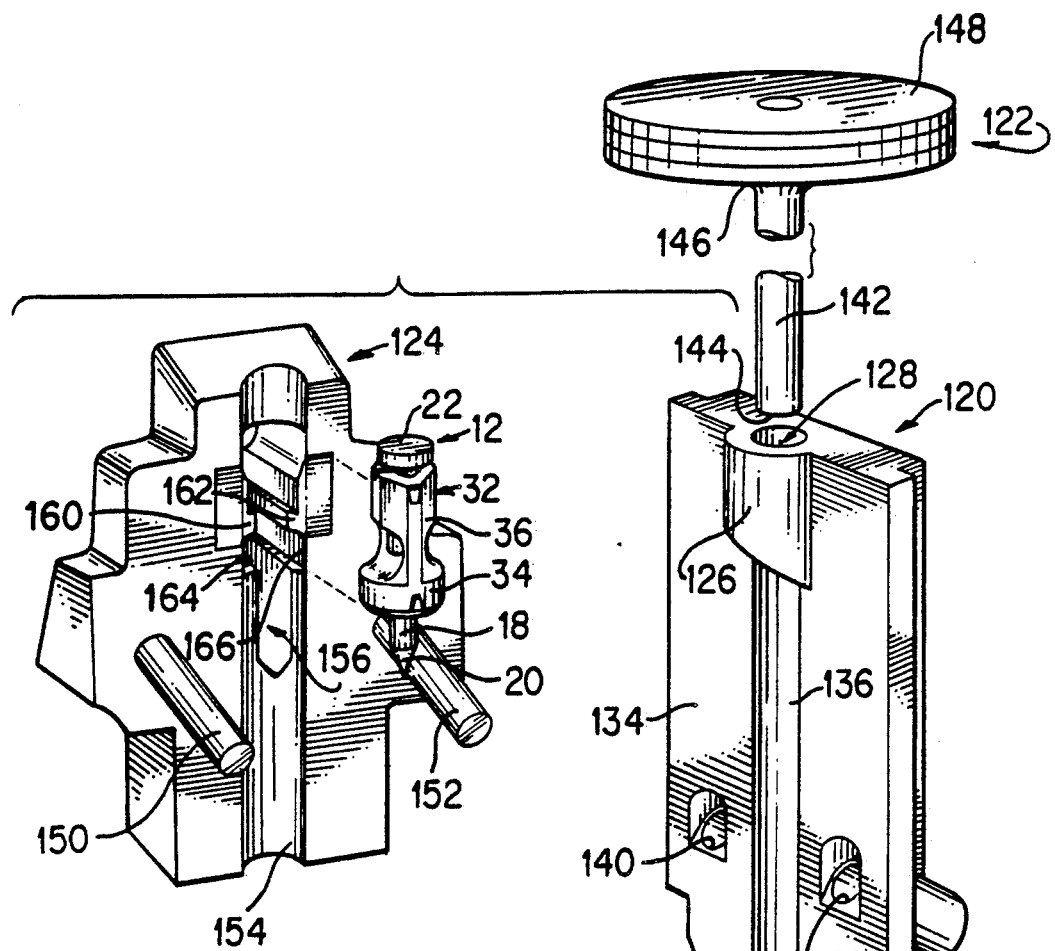
FIG. 16, on a larger scale, is an exploded perspective view of certain components of a fastener-driving tool, as used with such a sleeve and such a fastener from the strip.

In FIGS. 15 and 16, the firstmost fastener 12 of the strip 10 and the associated sleeve 32 are shown, as used coactively with certain components of a fastener-driving tool, which may be pneumatically powered or combustion-powered. These components include a nosepiece 120, a driving mechanism 122, and a guiding device 124, as described below. Other components of the fastener-driving tool are not critical to this invention and may be well known components of such a tool. A combustion-powered, fastener-driving tool available commercially from ITW Paslode (a unit of Illinois Tool Works Inc.) of Lincolnshire, Ill., under its IMPULSE ™ trademark is a preferred tool, into which these components can be readily incorporated. Such combustion-powered tools are similar to the combination-powered tools disclosed in Nikolich U.S. Pat. Nos. 4,403,722, 4,483,280, 4,522,162, and Re. 32,452. Reference may be had to these patents for further details of such a tool.

The nosepiece 120, which is similar to known nosepieces of fastener-driving tools, is machined from a steel casting so as to have an upper, tubular portion 126 having a cylindrical bore 128 therethrough, a lower, tubular portion 130 having a cylindrical bore 132 therethrough, and a wall 134 extending between the tubular portions 126, 130. The bores 128, 132, are aligned with each other. Between the bores 128, 132, the wall 134 defines a semicylindrical groove 136, which is aligned with the bores 128, 132. The nosepiece 120 has two sockets 138, 140, which project downwardly from the wall 134 at similar angles, as shown. The bore 128, the groove 136, and the bore 132 are configured similarly, so as to permit any fastener 12 from the strip 10 and the associated sleeve 32 to be forcibly driven from the groove 136, through the bore 132, in a manner to be later described.

Figure 18:
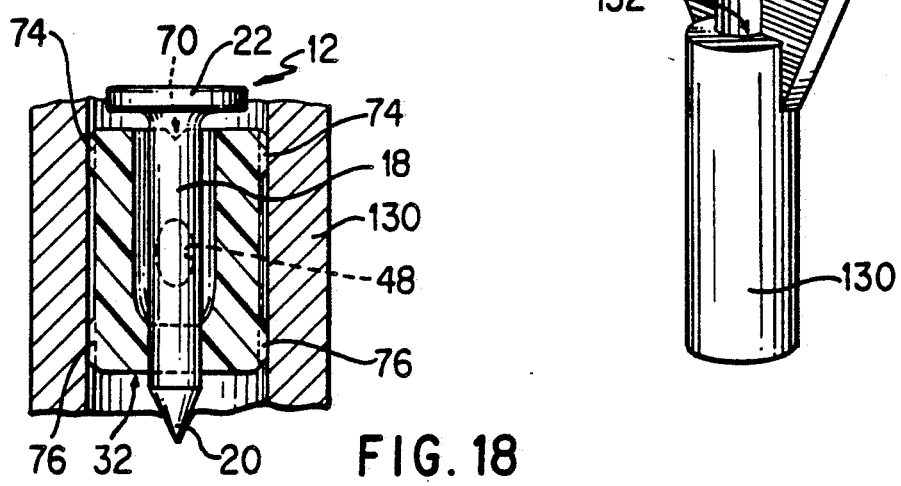
FIG. 18 is an axial, cross-sectional view of a tubular portion of the nosepiece, in which a representative sleeve and a fastener gripped thereby are shown as centered in a bore defined by the tubular portion.

As mentioned above, the frangible bridges 74, 76, lend dimensional uniformity to the respective sleeves 32. As shown in FIG. 18, in which a representative sleeve 32 and the fastener 12 gripped by such sleeve 32 are shown in the bore 132 of the lower, tubular portion 130 of the nosepiece 120, such sleeve 32 and retained portions of the frangible bridges 72, 74, that had connected such sleeve 32 to the preceding and following sleeves 32 fit snugly into the passageway defined by the semi-cylindrical grooves 136, 154, and into the bore 132, so as to center the fastener 12 gripped by such sleeve 32 within the bore 132. An end sleeve 32 having one of the ribs 96, 98, as well as retained portions of the frangible bridges 72, 74, that had connected the end sleeve 32 to an adjacent sleeve 32 fits similarly into the passageway defined by the semi-cylindrical grooves 136, 154, and the bore 132.

The driving mechanism 122 comprises a driver blade 142, which has a distal end 144 and a proximal end 146, and a piston 148, which is secured to the proximal end 146 in a known manner. The piston 148 is mounted operatively within a cylinder (not shown) from which the driver blade 142 extends in a known manner. The piston 148 and the driver blade 142 are arranged in a known manner to be conjointly and forcibly driven by compressed air or combustion products within the cylinder. The distal end 144 of the driver blade 142 is arranged to strike the head of a fastener 12 so as to drive the fastener 12 and the associated sleeve 32 forcibly through the bore 132. The piston 148 may strike an elastomeric bumper (not shown) arranged within the cylinder in a known manner so as to arrest driving movement of the piston 148 and the driving rod 142.

The guiding device 124, which is machined from a steel casting, has two steel pins 150, 152, affixed thereto, so as to project from the guiding device 124 at similar angles, as shown. The steel pins 150, 152, fit respectively into the sockets 138, 140, so as to position the guiding device 124 against the nosepiece 120, in an operative position, in which the guiding device 124 is secured to the nosepiece 120 by other structures (not shown) of the fastener-driving tool. The guiding device 124 has a semicylindrical groove 154, which matches the semicylindrical groove 136 of the nosepiece 120 so that the grooves 136, 154, and the bores 128, 132, define a continuous passageway when the guiding device 124 is positioned in the operative position. The guiding device 124 has an aperture 156, which opens into the groove 154, and which is configured so as to allow any fastener 12 of the strip 10 and the associated sleeve 32 to pass through the aperture 156, into the continuous passageway defined by the semicylindrical grooves 136, 154, and the bores 128, 132. The guiding device 124 has a pair of parallel ribs 160, 162, which are provided by hardened steel inserts on opposite sides of the aperture 156. The guiding device 124 is arranged to receive the strip 10 of collated fasteners 12 from a magazine (not shown) having a mechanism for feeding the strip 10 longitudinally to the guiding device 124, in a known manner, so as to advance a succeeding fastener 12 after a preceding fastener 12 has been driven. Also, the magazine may be advantageously provided with a pair of parallel ribs aligned with the parallel ribs 160, 162.

Figure 17:
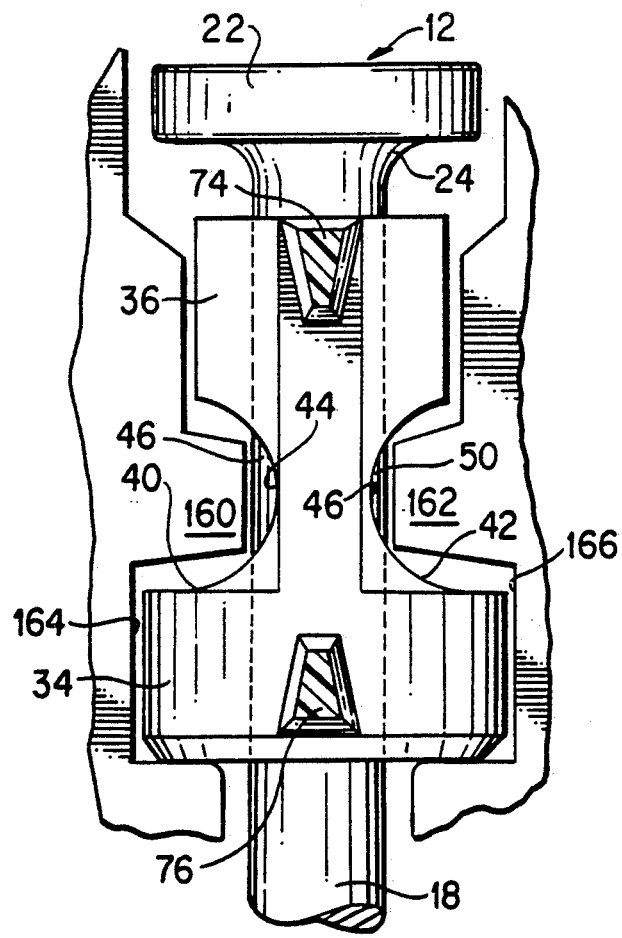
FIG. 17, on a larger scale compared to FIG. 16, is a fragmentary, elevational view of some of the components shown in FIG. 16, as used with the same sleeve and the same fastener.

As shown in FIG. 17, each of the ribs 160, 162, fits into a respective one of the concave recesses 40, 42, of the sleeve 32 associated with the firstmost fastener 12, into close proximity with the emerging portions 46, 50, of the shank 18 of the firstmost fastener 12, so as to guide the strip 10 between the parallel ribs 160, 162, whereby the firstmost fastener 12 and the associated sleeve 32 are guided into a position in the grooves 136, 154, where such fastener 12 and such sleeve 32 can be forcibly driven from the grooves 136, 154, by the driving mechanism 122. The annular portion 34 of the associated sleeve 32 is disposed slidably within two grooves 164, 166, formed in the guiding device 124, on opposite sides of the aperture 156.

Thus, frictional contact between polymeric surfaces of the carrier 30 and steel surfaces of the guiding device 124 is minimized, which is desirable. Where frictional contact cannot be readily avoided, frictional contact between steel surfaces (i.e., between of the emerging portions 46, 50, of the shanks 18 of the fasteners 12 and steel surfaces of the parallel ribs 160, 162) is promoted, which is preferred. Frictional contact between steel surfaces is preferred over frictional contact between polymeric surfaces and steel surfaces because of dimensional tolerances. Dimensions of steel parts can be ordinarily controlled within closer tolerances, as contrasted with dimensions of polymeric parts, particularly parts molded from polymeric materials.

Various modifications may be made in the preferred embodiment of a strip of collated nails and in the aforesaid components of a fastener-driving tool without departing from the scope and spirit of this invention.

We claim:
1. A strip of collated fasteners, the strip comprising a plurality of fasteners and a carrier molded from a poly- meric material, each fastener having an elongate shank with a pointed end and a head and being designed to be forcibly driven through a workpiece, into a substrate, the shank having a portion flaring outwardly where the shank adjoins the head, the carrier comprising a separate sleeve associated with each fastener, a representative sleeve including an annular portion and a breakable portion integral with the annular portion, the representative sleeve gripping the shank of the associated fastener with the annular portion nearer to the pointed end of the shank of the associated fastener and with the breakable portion nearer to the head of the associated fastener, the breakable portion having an end opposite to the annular portion and having a pair of similar laterally opposed, outwardly opening, continuously curved, concave recesses shaping the breakable portion so that the breakable portion constitutes means for breaking into at least two segments, approximately along a vertical plane bisecting each of the concave recesses, when the outwardly flaring portion of the shank of the associated fastener bears against said end of the breakable portion as the associated fastener is being driven forcibly through a workpiece, into a substrate, after the annular portion has been arrested by the workpiece, the annular portion constituting means for eliminating any gap between the head of the associated fastener and the workpiece after the associated fastener has been driven, the respective segments tending to remain integral with the annular portion after the associated fastener has been driven, the carrier comprising frangible bridges between adjacent ones of the sleeves of the carrier.

2. The strip of claim 1 wherein said end is notched in two locations, generally along a line where the vertical plane bisecting each of the concave recesses meets said end.

3. The strip of claim 1 wherein each of the concave recesses has a curved surface with an open window, from which a portion of the shank of the associated fastener emerges.

4. The strip of claim 1 wherein the annular portion has a circular aperture having a cylindrical wall gripping a portion of the shank of the associated fastener and wherein the breakable portion has a generally polygonal aperture having plural interior faces confining a portion of the shank of the associated fastener.

5. The strip of claim 4 wherein the breakable portion has a generally polygonal shape having plural exterior faces and wherein each of the interior faces is oriented so as to be substantially parallel to a respective one of the exterior faces.

6. The strip of claim 5 wherein the generally polygonal aperture is a generally quadrilateral aperture having four faces confining a portion of the shank of the associated fastener.

7. The strip of claim 6 wherein the breakable portion has a generally hexagonal shape having six exterior faces, two of which are parallel to each other but not to any of the interior faces.

8. The strip of claim 7 wherein said end is notched in two locations, generally along a line where the vertical plane bisecting each of the concave recesses meets said end.

9. A strip of collated fasteners, the strip comprising a plurality of fasteners and a carrier molded from a polymeric material, each fastener having an elongate shank with a pointed end and a head and being designed to be forcibly driven through a workpiece, into a substrate, the carrier comprising a separate sleeve associated with each fastener, a representative sleeve including a lower, annular portion and an upper portion integral with the annular portion, the representative sleeve gripping the shank of the associated fastener with the lower, annular portion nearer to the pointed end of the shank of the associated fastener and with the upper portion nearer to the head of the associated fastener, the upper portion having at least one outwardly opening, curved, concave recess having an open window, from which a portion of the shank of the associated fastener emerges, the carrier comprising frangible bridges between adjacent ones of the sleeves of the carrier.

10. The strip of claim 9 wherein the concave recess is one of a pair of laterally opposed, similarly curved, concave recesses, each concave recess having an open window, from which a portion of the shank of the associated fastener emerges, the emerging portions being opposed diametrically to each other.

11. In a fastener-driving tool, a combination comprising a strip of collated fasteners and means for guiding the strip of collated fasteners longitudinally, the strip comprising a plurality of fasteners and a carrier molded from a polymeric material, each fastener having an elongate shank with a pointed end and a head and being designed to be forcibly driven through a workpiece, into a substrate, the carrier comprising a sleeve associated with each fastener, a representative sleeve including a lower, annular portion and an upper portion integral with the annular portion, and gripping the shank of the associated fastener with the lower, annular portion nearer to the pointed end of the shank of the associated fastener and with the upper portion nearer to the head of the associated fastener, the upper portion having an upper end and having a pair of similar, laterally opposed, outwardly opening, continuously curved, concave recesses, each concave section having an open window, from which a portion of the shank of the associated fastener emerges, the emerging portions being opposed diametrically, the carrier comprising frangible bridges between adjacent ones of the sleeves of the carrier, the guiding means comprising a pair of parallel ribs, each rib fitting into a respective one of the concave recesses of at least one sleeve of the carrier, into close proximity with the emerging portions of the shanks gripped by the last-mentioned sleeve, so as to guide the strip of collated fasteners between the parallel ribs, which are spaced from each other so as to permit the strip of collated fasteners to move along and between the parallel ribs.

12. The combination of claim 11 comprising a nosepiece with a bore configured to permit any fastener of the strip and the sleeve gripping the fastener to enter the bore and to be forcibly driven through the bore and means for driving a firstmost fastener of the strip and the sleeve gripping the firstmost fastener forcibly through the bore, the guiding means being arranged to guide the strip of collated fasteners so as to guide the firstmost fastener and the sleeve gripping the firstmost fastener into a position where the firstmost fastener of the strip and the sleeve gripping the firstmost fastener can enter the bore and can be forcibly driven through the bore by the driving means.

13. The combination of claim 12 wherein the frangible bridges between the representative sleeve and other portions of the carrier constitute means for shearing so as to separate the representative sleeve and retained portions of the frangible bridges therebetween from other portions of the carrier, such that representative sleeve and retained portions fit snugly into the bore, so as to center the fastener gripped by the representative sleeve within the bore, whereby the fastener gripped by the representative sleeve can be accurately driven.

14. The combination of claim 11 whereupon the concave recesses shape the representative sleeve so that the breakable portion constitutes means for breaking into at least two segments, approximately along a vertical plane bisecting each of the concave recesses, as the associated fastener is being driven forcibly through a workpiece, into a substrate, after the annular portion has been arrested by the workpiece, the annular portion constituting means for eliminating any gap between the head of the associated fastener and the workpiece after the associated fastener has been driven, the respective segments tending to remain integral with the annular portion after the associated fastener has been driven.

* * * * *